(12) United States Patent
Wang et al.

(10) Patent No.: US 9,769,033 B2
(45) Date of Patent: Sep. 19, 2017

(54) SERVICE-BASED COMMUNICATION NETWORK EVALUATION METHOD AND DEVICE

(71) Applicant: ZTE CORPORATION, Shenzhen, Guangdong Province (CN)

(72) Inventors: Shuai Wang, Shenzhen (CN); Hong Yu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 240 days.

(21) Appl. No.: 14/428,729

(22) PCT Filed: Jun. 28, 2013

(86) PCT No.: PCT/CN2013/078290
§ 371 (c)(1),
(2) Date: Mar. 17, 2015

(87) PCT Pub. No.: WO2013/178121
PCT Pub. Date: Dec. 5, 2013

(65) Prior Publication Data
US 2015/0229540 A1    Aug. 13, 2015

(30) Foreign Application Priority Data

Sep. 18, 2012 (CN) .......................... 2012 1 0345632

(51) Int. Cl.
*G06F 15/16* (2006.01)
*H04L 12/24* (2006.01)
(Continued)

(52) U.S. Cl.
CPC .... *H04L 41/5032* (2013.01); *G06F 17/30876* (2013.01); *H04L 41/22* (2013.01);
(Continued)

(58) Field of Classification Search
CPC ..... H04L 12/2861; H04L 41/12; H04L 41/08; H04L 65/80
(Continued)

(56) References Cited

U.S. PATENT DOCUMENTS 6,789,090 B1    9/2004 Miyake et al.
7,697,426 B2    4/2010 Gummalla et al.
(Continued)

FOREIGN PATENT DOCUMENTS

CN    101247282 A    8/2008
CN    102355691 A    2/2012
(Continued)

*Primary Examiner* — Wing F Chan
*Assistant Examiner* — Andrew Woo
(74) *Attorney, Agent, or Firm* — Ling Wu; Stephen Yang; Ling and Yang Intellectual Property

(57) ABSTRACT

The embodiment of the present document discloses a service-based communication network evaluation method and apparatus. The method comprises: obtaining basic network data on a network element management system (EMS); and sending an evaluation execution command to the EMS to obtain service type data required by a service to be evaluated and single-point network element data on a service link, and evaluating these data according to an evaluation rule of a preset evaluation item, so as to obtain a service evaluation result with the service as granularity. The embodiment of the present document can achieve service object-based network quality evaluation, can evaluate a service to display the health status of a network thereof, and meanwhile can also adopt a high-efficiency processing mechanism of multi-level combining and sending an evaluation execution command and of splitting the data obtained from the EMS, thereby better supporting the network quality evaluation and optimization.

12 Claims, 3 Drawing Sheets

(51) Int. Cl.
*G06F 17/30* (2006.01)
*H04L 12/26* (2006.01)

(52) U.S. Cl.
CPC .......... *H04L 41/5038* (2013.01); *H04L 43/04* (2013.01); *H04L 41/12* (2013.01)

(58) Field of Classification Search
USPC ........................................ 709/223, 224, 226
See application file for complete search history.

(56) References Cited

U.S. PATENT DOCUMENTS

| | | | |
|---|---|---|---|
| 2007/0195695 A1* | 8/2007 | Healy | ................ H04L 41/5067 370/230 |
| 2010/0211629 A1* | 8/2010 | Ok | ....................... H04L 41/044 709/203 |
| 2010/0315955 A1 | 12/2010 | Proulx et al. | |
| 2011/0255422 A1 | 10/2011 | Narasappa et al. | |

FOREIGN PATENT DOCUMENTS

| | | | |
|---|---|---|---|
| CN | 102404137 A | 4/2012 |
| EP | 1784027 A1 | 5/2007 |
| JP | H11340980 A | 12/1999 |
| JP | 2003092571 A | 3/2003 |
| JP | 2010502089 A | 1/2010 |
| JP | 2012015668 A | 1/2012 |
| WO | 2004004217 A1 | 1/2004 |
| WO | 2008039973 A1 | 4/2008 |

* cited by examiner

SERVICE-BASED COMMUNICATION NETWORK EVALUATION METHOD AND DEVICE

TECHNICAL FIELD

The present document relates to the technology field of network communication management, and in particular, to a service-based communication network evaluation method and apparatus which takes communication services as evaluation objects.

BACKGROUND OF THE RELATED ART

Along with the growing of the communication network, it appears more important of how to ensure the stability and the security of a network. Thus, it becomes a new technical field that inspection and evaluation analysis is performed to indexes of communication network resources, such as running status and security, etc.

The scale of the network is expanded, which means that the number of various services in the network is increased, for example, the number of the services, such as, Ethernet services, Time-Division Multiplexing (TDM) services, protecting subnets, tunnels, pseudo-lines, etc., in a bearer network are increasing constantly. Thus whether the network can be run healthily and stably becomes the problem to be paid urgently attention to in the industry.

Now, in the inspection and evaluation of the communication network, it usually adopts an evaluation that is performed by taking a network element (NE) as an evaluation object (or granularity). By adopting the method, as for an evaluation item taking the network element as the granularity, such as evaluating various data of an operation status of the equipment, better support can be provided; but for an evaluation item taking the service as the granularity, then it cannot provide very good support. For example, for the services in the bearer network, such as, the end-to-end Ethernet services, the TDM services, protecting the subnets, the tunnels, the pseudo-lines, links, etc., if commands are only sent by taking the network element as the granularity according to the current evaluation mode, then the abnormal information can only be showed with results according to the network element dimension, which leads to a fact that the abnormal information of multiple network elements which are passed by one service are all required to be displayed repeatedly for that service; thus, the abnormal information of the whole service is shown scatteredly, the evaluation concept of the whole service cannot be set up and it is adverse to the more effective evaluation service.

CONTENT OF THE INVENTION

The embodiments of the present document provide a service-based communication network evaluation method and apparatus which regards the communication service as the evaluation object.

A service-based communication network evaluation method comprises:

obtaining basic network data on a network element management system (EMS); and sending an evaluation execution command to the EMS to obtain service type data required by a service to be evaluated and single-point network element data on a service link, and evaluating and analyzing the service type data and the single-point network element data according to an evaluation rule of a preset evaluation item, so as to obtain a service evaluation result with the service as granularity.

Preferably, the basic network data comprise network element type data and topology type data.

Preferably, the step of obtaining the basic network data on the EMS comprises:

performing resource synchronization to the EMS to obtain the basic network data;

or, directly recovering basic backup data stored in the EMS to obtain the basic network data.

Preferably, the step of sending the evaluation execution command to the EMS to obtain the service type data of the service to be evaluated and the single-point network element data on the service link comprises:

when multiple evaluation items are evaluated at the same time and types of services to be evaluated corresponding to the multiple evaluation items are same, for each evaluation item sending the evaluation execution command to the EMS respectively;

computing various evaluation execution commands and performing a combination process to the evaluation execution commands, to obtain one combined evaluation command, and obtaining the service type data of the service to be evaluated and the single-point network element data on the service link from the EMS according to the combined evaluation command; and splitting the obtained service type data and single-point network element data to each corresponding evaluation item.

Preferably, the method further comprises:

executing the following steps when data of every single-point network element on the service to be evaluated are required to be obtained to evaluate a quality of the service:

computing various evaluation execution commands and performing the combination process to the evaluation execution commands, to obtain one combined evaluation command, and obtaining the service type data required by the service to be evaluated and the single-point network element data on the service link from the EMS according to the combined evaluation command; and splitting the obtained service type data and single-point network element data to each corresponding evaluation item.

Preferably, the method further comprises:

stamping a timestamp on the service evaluation result with the service as the granularity and storing into a database.

Preferably, after obtaining the basic network data on the EMS, the method further comprises:

obtaining a corresponding service evaluation result from the database according to a user input command and displaying the result.

A service-based communication network evaluation apparatus comprises:

an basic data obtaining module, configured to obtain basic network data on a network element management system (EMS); and an evaluation execution module, configured to send an evaluation execution command to the EMS to obtain service type data required by a service to be evaluated and single-point network element data on a service link, and evaluate the service type data and the single-point network element data according to an evaluation rule of a preset evaluation item, so as to obtain a service evaluation result with the service as granularity.

Preferably, the basic network data comprise network element type data and topology type data.

Preferably, the basic data obtaining module is configured to obtain the basic network data on the EMS by the following mode:

performing resource synchronization to the EMS to obtain the basic network data;

or, directly recovering basic backup data stored in the EMS to obtain the basic network data.

Preferably, the evaluation execution module is configured to send the evaluation execution command to the EMS to obtain the service type data of the service to be evaluated and the single-point network element data on the service link by the following mode:

when multiple evaluation items are evaluated at the same time and types of services to be evaluated corresponding to the multiple evaluation items are same, for each evaluation item sending the evaluation execution command to the EMS respectively;

computing various evaluation execution commands and performing a combination process to the evaluation execution commands, to obtain one combined evaluation command, and obtaining the service type data of the service to be evaluated and the single-point network element data on the service link from the EMS according to the combined evaluation command; and splitting the obtained service type data and single-point network element data to each corresponding evaluation item.

Preferably, the evaluation execution module is further configured to: after splitting the obtained service type data and single-point network element data to each corresponding specific evaluation item, when every single-point network element data on the service to be evaluated are required to be obtained to evaluate a quality of the service:

compute various evaluation execution commands and perform the combination process to the evaluation execution commands, to obtain one combined evaluation command, and obtain the service type data required by the service to be evaluated and the single-point network element data on the service link from the EMS according to the combined evaluation command; and split the obtained service type data and single-point network element data to each corresponding evaluation item.

Preferably, the evaluation execution module comprises:

a command combination unit, configured to: when multiple evaluation items are evaluated at the same time and types of services to be evaluated corresponding to the multiple evaluation items are same, compute multiple evaluation execution commands sent to the EMS and perform a combination process to the multiple evaluation execution commands, to obtain one combined evaluation command;

a command sending unit, configured to: send the combined evaluation command, and obtain the service type data required by the service to be evaluated and the single-point network element data on the service link from the EMS;

a data splitting unit, configured to: split the service type data and the single-point network element data to the corresponding evaluation item; and an evaluation unit, configured to: evaluate these data according to the evaluation rule of the preset evaluation item, to obtain the service evaluation result with the service as the granularity.

Preferably, the command sending unit is further configured to send a single evaluation execution command without the combination process.

Preferably, the above-mentioned apparatus further comprises:

a database, configured to: after the evaluation execution module stamps a timestamp on the service evaluation result with the service as the granularity, store the service evaluation result.

Preferably, the above-mentioned apparatus further comprises:

an evaluation result displaying module, configured to: after the basic data obtaining module obtains the basic network data on the EMS, obtain a corresponding service evaluation result from the database according to a user input command and displaying the result, or display these service evaluation results after the evaluation execution modules obtains the service evaluation result with the service as the granularity.

The service-based communication network evaluation method and apparatus provided by the embodiment of the present document can realize the service object-based network quality evaluation, and can perform the evaluation to the service to show the health condition of its service. Meanwhile, it can also adopt the high-efficiency processing mechanism of multi-level combining and sending the evaluation execution commands and of splitting the data obtained from the EMS, which supports the network quality evaluation and optimization better.

For the service-based communication network quality evaluation method and apparatus provided by the embodiments of the present document, it regards the service as the evaluation object and the execution element innovatively, which requires to obtain the evaluation items of the same service type at first and adopts combining and sending the evaluation execution commands to obtain the services, and then secondly integrates the data to distribute to every evaluation item, thereby avoiding repeatedly sending the commands.

Secondly, it can support two situations of service evaluations: one, when there is no need to obtain the data of every single-point network element on the service to evaluate the quality of the service, it can regard the whole service as the object (or the granularity) to send the commands, and obtain the evaluation data of the whole service finally; two, when it is needed to obtain the data of every single-point network element on the service to evaluate the quality of the service, it can regard the service as the object (or the granularity) to send the commands, and send the commands through the EMS to all network elements or A/Z endpoint network elements on the service path after sending the evaluation commands, and then, when every evaluation item needs to obtain the same commands of the single-point network elements, the command combining and sending mechanism is adopted again, and the data reported by the network elements are reported to the evaluation system again by adopting the command integration policy. Thus, it supports the evaluation with the service as the element very well like this.

Compared with the network evaluation method with the network element as the granularity, the embodiment of the present document can well evaluate the service in the communication network, thus helping the business person to have a more visual understanding and appraisal on the health status of various service granularities in the communication network.

PREFERRED EMBODIMENTS OF THE PRESENT INVENTION

Figure 1:
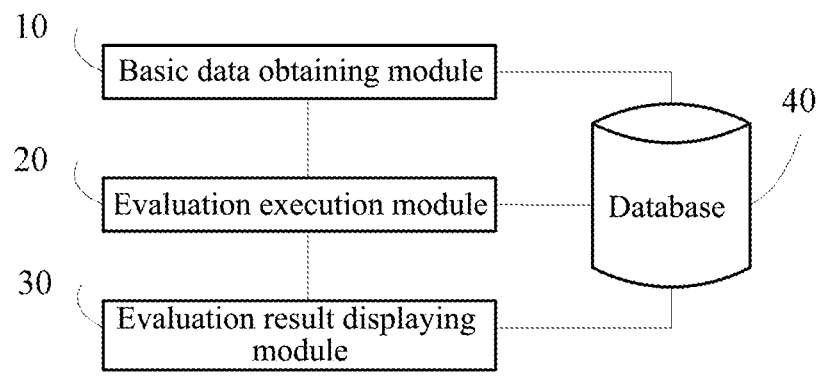
FIG. 1 is a structure diagram of a service-based communication network evaluation apparatus provided by an embodiment of the present document.

In order to make the skilled in the art understand the present document much better and be able to implement, embodiments of the present document are described in detail with reference to the accompanying drawings hereinafter. However, the cited embodiments are not intended to limit the present document. In the case of not conflicting, the embodiments in the present application and features in these embodiments can be combined with each other.

A service-based communication network evaluation method provided by the embodiment of the present document includes the following steps.

In S10, basic network data on a network element management system (EMS) are obtained; preferably, the basic network data include network element type data and topology type data.

In S20, an evaluation execution command is sent to the EMS to obtain service type data required by a service to be evaluated and single-point network element data on a service link, and these data are evaluated according to an evaluation rule of a preset specific evaluation item, so as to obtain a service evaluation result with the service as granularity.

In the step S10, obtaining the basic network data on the EMS includes the following steps:

in S101, the basic network data are obtained by the mode of performing resource synchronization to the EMS;

or, in S102, the basic network data are obtained by the mode of directly recovering basic backup data stored in the EMS.

In the step S20, the step of sending the evaluation execution command to the EMS to obtain the service type data required by the service to be evaluated and the single-point network element data on the service link includes the following steps:

in S201, when multiple evaluation items are evaluated at the same time and types of services to be evaluated corresponding to the evaluation items are same, the evaluation execution commands are sent to the EMS respectively for each evaluation item;

in S202, various sent evaluation execution commands are compute and a combination process is performed to them, to obtain one combined evaluation command, and the service type data required by the service to be evaluated and the single-point network element data on the service link are obtained from the EMS according to the combined evaluation command;

in S203, the obtained service type data and single-point network element data are split to the corresponding evaluation item.

After the step of splitting the obtained service type data and single-point network element data to the corresponding specific evaluation item, the method further includes the following steps:

in S204, the following steps are executed when data of every single-point network element on the service to be evaluated are required to be obtained to evaluate a quality of the service:

in S205, the various sent evaluation execution commands are computed and the combination process is performed to them, to obtain one combined evaluation command, and the service type data required by the service to be evaluated and the single-point network element data on the service link are obtained from the EMS according to the combined evaluation command;

in S206, the obtained service type data and single-point network element data are split to the corresponding specific evaluation item.

After the step S20 of sending the evaluation execution command to the EMS to obtain the service type data required by the service to be evaluated and the single-point network element data on the service link and evaluating these data according to the evaluation rule of the preset specific evaluation item to obtain the service evaluation result with the service as the granularity, the method further includes the following steps:

in S30, a timestamp is stamped on the service evaluation result with the service as the granularity and stored into a database.

After obtaining the basic network data on the EMS, the method further includes the following steps:

in S11, a corresponding service evaluation result is taken from the database according to a user input command and displayed.

As shown in FIG. 1, the embodiment of the present document further provides a service-based communication network evaluation apparatus including:

an basic data obtaining module 10, which is configured to obtain basic network data on a network element management system (EMS); wherein, preferably, the basic network data include network element type data and topology type data;

an evaluation execution module 20, which is configured to send an evaluation execution command to the EMS to obtain service type data required by a service to be evaluated and single-point network element data on a service link, and evaluate these data according to an evaluation rule of a preset specific evaluation item, so as to obtain a service evaluation result with the service as granularity.

In the preferable embodiment, the basic data obtaining module 10 obtains the basic network data by the mode of performing resource synchronization to the EMS;

or, the basic network data are obtained by the mode of directly recovering basic backup data stored in the EMS.

In addition, it is open to other methods used by the basic data obtaining module 10 to obtain the basic network data on the EMS, and the present context will not go into details here.

In the preferable embodiment, the evaluation execution module 20, which is configured to send the evaluation execution command to the EMS to obtain the service type data required by the service to be evaluated and the single-point network element data on the service link, including:

(1) when multiple evaluation items are evaluated at the same time and types of services to be evaluated corresponding to the evaluation items are same, the evaluation execution module 20 sends the evaluation execution commands to the EMS respectively;

(2) various sent evaluation execution commands are compute and the combination process is performed to them, to obtain one combined evaluation command, and the service type data required by the service to be evaluated and the single-point network element data on the service link are obtained from the EMS according to the combined evaluation command;

(3) the obtained service type data and single-point network element data are split to the corresponding evaluation item.

Preferably, after the evaluation execution module 20 splits the obtained service type data and single-point network element data to the corresponding evaluation item, it further includes:

(4) when data of every single-point network element on the service to be evaluated are required to be obtained to evaluate the quality of the service, the following steps are executed:

(5) various sent evaluation execution commands are compute and the combination process is performed to them, to obtain one combined evaluation command, and the service type data required by the service to be evaluated and the single-point network element data on the service link are obtained from the EMS according to the combined evaluation command;

(6) the obtained service type data and single-point network element data are split to the corresponding specific evaluation item.

Figure 2:
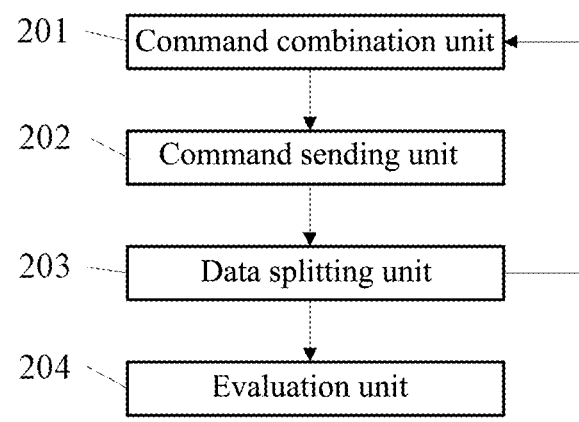
FIG. 2 is a structure diagram of an evaluation execution module provided by an embodiment of the present document.

In the embodiment of the present document, as shown in FIG. 2, the evaluation execution module 20 includes the following units.

A command combination unit 201 is configured to: when multiple evaluation items are evaluated at the same time and types of services to be evaluated corresponding to the evaluation items are same, the multiple evaluation execution commands sent to the EMS for the evaluation items are computed and the combination process is performed to them, to obtain one combined evaluation command;

Under the condition including the requirement to send multiple commands, it is responsible for the previous command computing work and the later command combination work; in the embodiment of the present document, it includes the multi-layer command combination procedures.

First of all, when in the situation that the multiple evaluation items are evaluated as to the services to be evaluated of the same type, for example: several evaluation items are evaluated as to the Ethernet services, then all evaluation items are used to obtain the evaluation execution commands of the Ethernet services to combine the evaluation execution commands into one combined evaluation command for sending.

Secondly, in another situation, after all evaluation items obtain the services, the data are required to be obtained for the single-point network element on the service link; for different evaluation items one or more same evaluation execution commands need to be sent, and here the commands are also combined and sent, and the data for different evaluation items regarding the command are combined and reported.

A command sending unit 202 is configured to: send the combined evaluation command, and obtain the service type data required by the service to be evaluated and the single-point network element data on the service link from the EMS; and in the embodiment of the present document, it is responsible for sending the combined evaluation command from the evaluation apparatus to the EMS, which also includes the command sending in two situations.

First of all, the combined evaluation command of the command combination unit 201 is sent following the previous description.

Secondly, in another situation, some combination evaluation commands without combination also perform the command sending in the present command sending unit 202.

In the embodiment of the present document, the command sending unit 202 is further configured to send a single evaluation execution command without the combination process.

The data splitting unit 203 is configured to: split the obtained service type data and the single-point network element data to the corresponding specific evaluation item.

The data obtained from the EMS are one combined data packet, and these data are required to be split to deliver to each evaluation item.

In the embodiment of the present document, the data splitting unit 203 splits the data in the following two situations:

first of all, the service data obtained by the combined evaluation command are split to each evaluation item;

secondly, the single-point network element data on the service link obtained by the combined evaluation command are split to each evaluation item.

The evaluation unit 204 is configured to: evaluate these data according to the evaluation rule of the preset evaluation item, to obtain the service evaluation result with the service as the granularity.

Following the above-mentioned command combination unit 201, command sending unit 202 and data splitting unit 203 which obtain the service data and the single-point network element data from the EMS, the evaluation unit 204 performs the data analysis to these data according to the evaluation rule of the preset evaluation item, thereby obtaining the service evaluation result with the service as the granularity.

In the embodiment of the present document, the evaluation unit 204 includes two situations of evaluation execution:

first of all, some evaluation items can perform the evaluation according to their own evaluation rules only with the requirement of the service data and without the single-point network element data;

secondly, some evaluation items need the real time data of the single-point network element on the service link, and generate the evaluation result with the real time data of the single-point network element associated with the service data and the rules of the evaluation items.

Preferably, the service-based communication network evaluation apparatus further includes:

a database 40, configured to: after the evaluation execution module 20 stamps a timestamp on the service evaluation result with the service as the granularity, store the service evaluation result.

In the preferable embodiment, the service-based communication network evaluation apparatus further includes:

an evaluation result displaying module 30, configured to: after the basic data obtaining module 10 obtains the basic network data on the EMS, obtain a corresponding service evaluation result from the database 40 according to a user input command and displaying the result, or display these service evaluation results after the evaluation execution modules 20 obtains the service evaluation result with the service as the granularity.

Usually, the evaluation result can be displayed by the mode, such as, a report form, a topological picture, etc.

Figure 3:
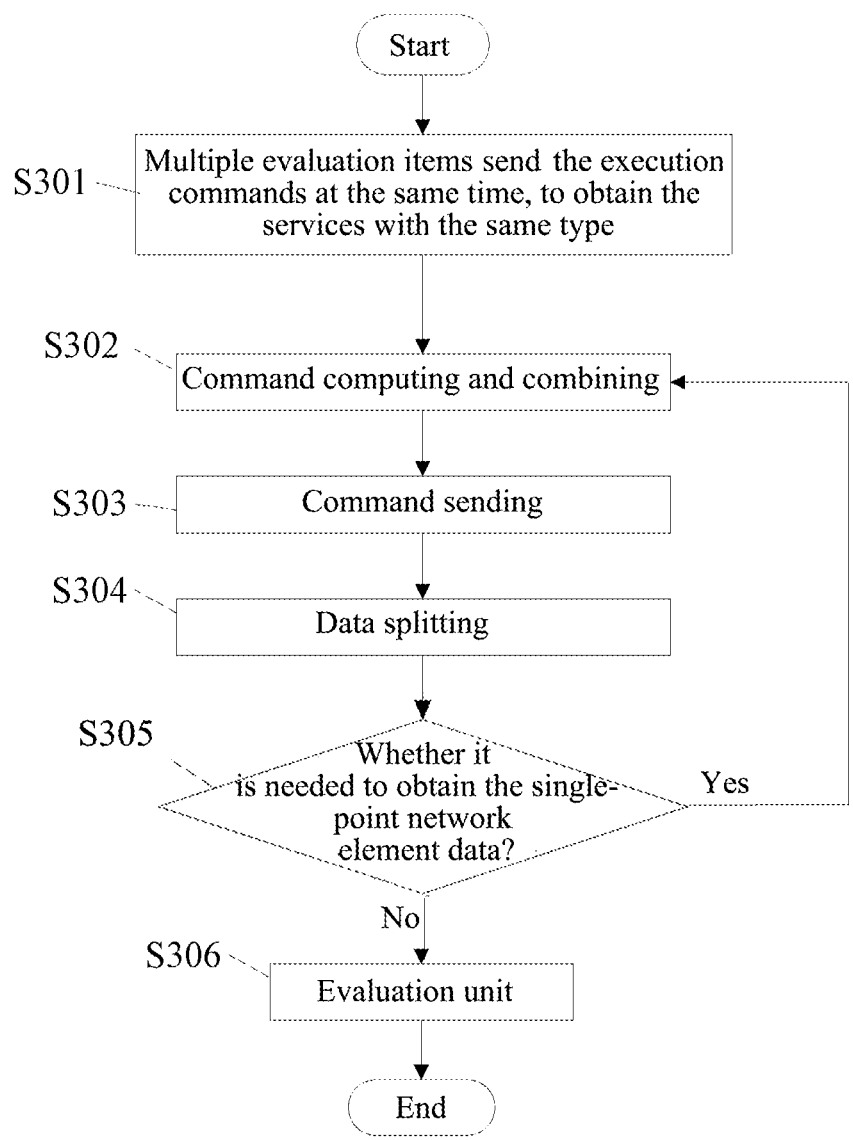
FIG. 3 is a work flow diagram of an evaluation execution module provided by an embodiment of the present document.

FIG. 3 is a work flow diagram of the evaluation execution module 20 provided by the embodiment of the present document, and the execution steps are as follows.

In S301, multiple evaluation items are evaluated at the same time, the service types required to be evaluated by the evaluation items are same, and then the command for starting the evaluation execution is sent, in order to obtain these services with the same type.

In S302, the command computing and combination unit is mainly responsible for command computing and command combination actions of each evaluation item. Regarding the evaluation items with the same service type, the evaluation system combines one command and sends to the EMS to obtain the service data; regarding the command required for obtaining each single-point network element, it combines these commands and sends to the network element of the service link to obtain the data.

In S303, the command sending unit 202 performs the command sending operation and data obtaining according to the combination command in step S302 and other commands without the combination.

In S304, the data splitting unit 203 splits the service data and the single-point network element data obtained in the step S303 to every evaluation item which requires the service.

In S305, it is judged whether the data of the single network element is required to be obtained; if yes, step S302 is entered, and if not, step S306 is entered.

In S306, each evaluation item performs the evaluation to the obtained service data and single-point network element data according to its own evaluation rule, and generates the evaluation result.

Figure 4:
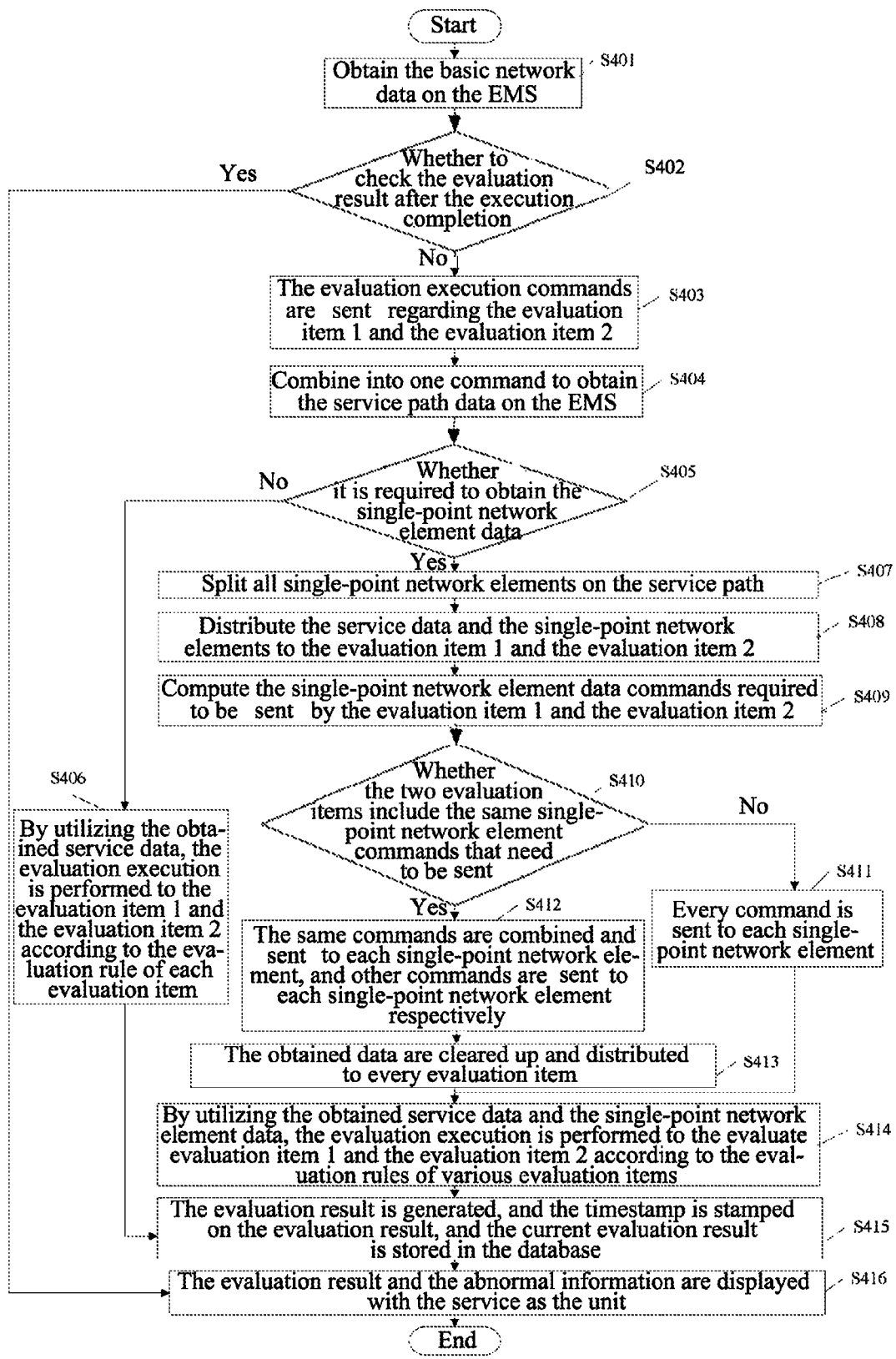
FIG. 4 is a flow chart of a service-based communication network evaluation method provided by an embodiment of the present document.

FIG. 4 is the flow chart of the service-based communication network evaluation method provided by the embodiment of the present document, and the detailed steps are described hereinafter.

In S401, the basic network data required by the evaluation are obtained from the EMS, and the basic network data include the network element type data and the topology type data.

The basic network data can be obtained by two modes:
one, obtaining by the mode of performing resource synchronization to the EMS;
two, directly recovering in the evaluation system the basic backup data stored in the EMS; and meanwhile, storing the obtained basic network data into the database 40 of the evaluation system.

In S402, it is selected to check the evaluation result that is stored in the database 40 and already evaluated completely directly according to the user input command, or perform a new evaluation execution.

If it is selected to check the evaluation result that is already evaluated completely directly, then step S416 is directly entered; if it is selected to perform the new evaluation execution, then the step S403 is entered.

In the embodiment of the present document, for every round of the evaluation execution, finally the evaluation result is stamped with the timestamp and stored in the database 40; in this way, it only needs to select the time point required to be checked, and then the service evaluation result of the corresponding time point can be checked.

In S403, the command sending operation is performed according to the combination commands and other commands without combining. In the embodiment of the present document, the procedures of sending the evaluation command simultaneously are explained for two different evaluation items (evaluation item 1 and evaluation item 2).

In S404, the evaluation apparatus sends the command to the EMS and obtains the service data required by the evaluation item 1 and the evaluation item 2.

For the evaluation items which take the service as the granularity, the services refer to the services in the bearer network, such as, the end-to-end Ethernet services, the TDM services, protecting the subnets, the tunnels, the pseudo-lines, the links, etc. In the embodiment of the present document, both the evaluation item 1 and the evaluation item 2 perform the evaluation by regarding the same service as the evaluation object. In order to enhance the efficiency and reduce the number of times for sending the commands, in the present step, the combination and sending from the evaluation apparatus to the EMS is once, in order to obtain the combined evaluation command of that type of service.

In S405, it is judged whether the data are required to be obtained from all network elements through which the service path passes according to the specific content items of the evaluation, which is mainly divided into the following two situations.

One, the evaluation service is performed without the device data of the single-point network element. For example, a linear tunnel protection group is included in the bearer network, and the user only needs to evaluate whether the operating path and the protection path pass through the same middle network element, that is, whether the operating/protection paths have the same route. For the service type content evaluation under this situation, it is enough to know only the service path and the network element data that the service passes, and there is no need to send the command to every single-point network element through the EMS to perform the device data acquisition. So, it only needs to obtain the path data and the basic network element node data of this service on the EMS, then this type of service evaluation can be performed.

Two, the evaluation service is performed requiring the device data of the single-point network elements. For example, the pseudo-lines are included in the bearer network, the user needs to know whether the speed limit configuration of the QoS of A/Z endpoint network element of one pseudo-line is overrun, then the real-time QoS data on the A/Z endpoint device are required to be obtained from the A/Z endpoint network element of the pseudo-line; and it is judged whether the whole pseudo-line is normal according to the QoS data.

According to the judgments of the above-mentioned two situations, if there is no need to obtain the device data from the single-point network element, then the step S406 is entered.

If it is needed to obtain the device data from the single-point network element, then the step S407 is entered.

In S406, by utilizing the obtained service data, the evaluation execution is performed to the evaluation item 1 and the evaluation item 2 according to the preset evaluation rules of various evaluation items, and it is obtained whether the evaluation results of the services in the evaluation item 1 and the evaluation item 2 are normal, that is, whether it is normal or abnormal.

In S407, all the obtained single-point network elements included on the service path are split, to make preparation for subsequently obtaining the real time device data on the single-point network elements.

In S408, the service data obtained by combining and sending the command in step S404 and the single-point network element data obtained by splitting the path in step S407 are distributed to the evaluation item 1 and the evaluation item 2, so as to regard the service data as the evaluation objects of the evaluation item 1 and the evaluation item 2 respectively.

In S409, the single-point network element data commands required to be sent by the evaluation item 1 and the evaluation item 2 are computed.

For example, in the situation 1: the evaluation item 1 needs to send command 1 and command 2 to the single-point network element to obtain the data, and the evaluation item 2 needs to send command 3 and command 4 to the single-point network element to obtain the data.

In the situation 2: the evaluation item 1 needs to send command 1 and command 2 to the single-point network element to obtain the data, and the evaluation item 2 needs to send command 1 and command 3 to the single-point network element to obtain the data.

In S410, it is judged in the commands computed in the step S409 are, whether the two evaluation items include the same command that needs to be sent to the single-point network element.

If it is the situation 1, that is, the commands that the two evaluation items need to send to the single-point network element are totally different, then step S411 is entered.

If it is the situation 2, both the evaluation item 1 and the evaluation item 2 need to send the command 1 to the single-point network element, and then step S412 is entered.

In S411, the commands are sent to every single-point network element, i.e., such as the command 3 and the command 4 are sent in the above-mentioned example.

In S412, the same commands are combined and sent to each single-point network element, and other commands are sent to each single-point network element respectively. That is, as the above example, the commands 1 for both the two little terms are combined and sent, and the command 2 and the command 3 are sent respectively.

In S413, the data obtained in the step S412 are reorganized and distributed to every evaluation item.

As described above, the single-point network element data obtained by combining and sending the command 1 are distributed to the evaluation item 1 and the evaluation item 2; and meanwhile, the data obtained by the command 2 and the command 3 are distributed to the evaluation item 1 and the evaluation item 2 respectively.

In S414, for every evaluation item, by utilizing the obtained service data and the single-point network element data, the evaluation execution is performed to the evaluate evaluation item 1 and the evaluation item 2 according to the preset evaluation rules of the various evaluation items, and then whether the evaluation results of the services in the evaluation item 1 and the evaluation item 2 are normal or not is obtained.

In S415, after finishing the evaluation execution, the evaluation result is generated, and the evaluation result data are stored in the database 40 at the same time, and the corresponding timestamp is stamped to every evaluation result.

In S416, the evaluation report at the corresponding time point is displayed according to the mode, such as a report form, a topological diagram, etc., and the evaluation result of every service is provided, in order to display the normal information and the abnormal information of every service.

It can be understood by those skilled in the art that various components of the apparatus and/or system and various steps in the method provide by the above-mentioned embodiments of the present document can be implemented by the universal computing apparatus; and they can be integrated in a single computing apparatus, or distributed in the network composed by a plurality of computing apparatus. Alternatively, they can be implemented by executable program codes of the computing apparatus. Accordingly, they can be stored in a storage apparatus and implemented by the computing apparatus, or they are made into various integrated circuit modules respectively, or a plurality of modules or steps therein are made into the single integrated circuit module to be implemented. In this way, the present document does not limit to any particular form of combination of the hardware and software.

Although the embodiments disclosed by the present document are as above described, the described content is only the embodiments adopted for conveniently understanding the present document but is not intended to limit the present document. For those skilled in the art, any modification and variation can be made on the form and details of the implementation without departing from the spirit and scope disclosed by the present document, however, the patent protection scope of the present document should still use the scope defined by the appending claims as the criterion.

INDUSTRIAL APPLICABILITY

The embodiments of the present document can well evaluate the services in the communication network, thereby helping the business personnel to have a more visual understanding and appraisal on the health status of the network of various service granularities in the communication network.

What we claimed is:

1. A service-based communication network evaluation method, comprising:
   obtaining basic network data on a network element management system (EMS); and
   sending an evaluation execution command to the EMS to obtain service type data of a service to be evaluated and single-point network element data on a service link, and evaluating and analyzing the service type data and the single-point network element data according to an evaluation rule of a preset evaluation item, so as to obtain a service evaluation result with the service as granularity;
   wherein, the step of sending the evaluation execution command to the EMS to obtain the service type data of the service to be evaluated and the single-point network element data on the service link comprises:
   when multiple evaluation items are evaluated at the same time and types of services to be evaluated corresponding to the multiple evaluation items are same, for each evaluation item sending the evaluation execution command to the EMS respectively;
   computing various evaluation execution commands and performing a combination process to the evaluation execution commands, to obtain one combined evaluation command, and obtaining the service type data of the service to be evaluated and the single-point network element data on the service link from the EMS according to the combined evaluation command; and
   splitting the obtained service type data and single-point network element data to each corresponding evaluation item;
   wherein, the method further comprises: executing the following steps when data of every single-point network element on the service to be evaluated are required to be obtained to evaluate a quality of the service:
   computing various evaluation execution commands and performing the combination process to the evaluation execution commands, to obtain one combined evaluation command, and obtaining the service type data of the service to be evaluated and the single-point network element data on the service link from the EMS according to the combined evaluation command; and splitting the obtained service type data and single-point network element data to each corresponding evaluation item.

2. The method according to claim 1, wherein, the basic network data comprise network element type data and topology type data.

3. The method according to claim 1, wherein, the step of obtaining the basic network data on the EMS comprises:

performing resource synchronization to the EMS to obtain the basic network data;

or, directly recovering basic backup data stored in the EMS to obtain the basic network data.

4. The method according to claim 1, further comprising:

stamping a timestamp on the service evaluation result with the service as the granularity and storing into a database.

5. The method according to claim 4, after obtaining the basic network data on the EMS, further comprising:

obtaining a corresponding service evaluation result from the database according to a user input command and displaying the corresponding service evaluation result.

6. A service-based communication network evaluation apparatus, comprising a processor and a storage device storing computer executable instructions that when executed by the processor cause the processor to execute the following modules:

a basic data obtaining module obtains basic network data on a network element management system (EMS); and an evaluation execution module sends an evaluation execution command to the EMS to obtain service type data of a service to be evaluated and single-point network element data on a service link, and evaluates the service type data and the single-point network element data according to an evaluation rule of a preset evaluation item, so as to obtain a service evaluation result with the service as granularity;

wherein, the evaluation execution module sends the evaluation execution command to the EMS to obtain the service type data of the service to be evaluated and the single-point network element data on the service link by the following mode:

for each evaluation item sending the evaluation execution command to the EMS respectively when multiple evaluation items are evaluated at the same time and types of services to be evaluated corresponding to the multiple evaluation items are same, computing various evaluation execution commands and performing a combination process to the evaluation execution commands, to obtain one combined evaluation command, and obtaining the service type data of the service to be evaluated and the single-point network element data on the service link from the EMS according to the combined evaluation command, and splitting the obtained service type data and single-point network element data to each corresponding evaluation item;

wherein, the evaluation execution module further performs the following steps:

after splitting the obtained service type data and single-point network element data to each corresponding specific evaluation item, and when every single-point network element data on the service to be evaluated are required to be obtained to evaluate a quality of the service:

computing various evaluation execution commands and perform the combination process to the evaluation execution commands, to obtain one combined evaluation command, and obtaining the service type data required by the service to be evaluated and the single-point network element data on the service link from the EMS according to the combined evaluation command, and splitting the obtained service type data and single-point network element data to each corresponding evaluation item.

7. The apparatus according to claim 6, wherein, the basic network data comprise network element type data and topology type data.

8. The apparatus according to claim 6, wherein, the basic data obtaining module obtains the basic network data on the EMS by the following mode:

performing resource synchronization to the EMS to obtain the basic network data; or, directly recovering basic backup data stored in the EMS to obtain the basic network data.

9. The apparatus according to claim 6, wherein, the evaluation execution module comprises a command combination unit, a command sending unit, a data splitting unit, and an evaluation unit; wherein the command combination unit computes multiple evaluation execution commands sent to the EMS and performs a combination process to the multiple evaluation execution commands when multiple evaluation items are evaluated at the same time and types of services to be evaluated corresponding to the multiple evaluation items are same, to obtain one combined evaluation command;

the command sending unit sends the combined evaluation command, and obtains the service type data required by the service to be evaluated and the single-point network element data on the service link from the EMS;

the data splitting unit splits the service type data and the single-point network element data to the corresponding evaluation item; and the evaluation unit evaluates these data according to the evaluation rule of the preset evaluation item, to obtain the service evaluation result with the service as the granularity.

10. The apparatus according to claim 9, wherein, the command sending unit sends a single evaluation execution command without the combination process.

11. The apparatus according to claim 6, further comprising a database, wherein the database stores the service evaluation result after the evaluation execution module stamps a corresponding timestamp on the service evaluation result with the service as the granularity.

12. The apparatus according to claim 6, further comprising an evaluation result displaying module, wherein the evaluation result displaying module obtains a corresponding service evaluation result from the database according to a user input command and displaying the corresponding service evaluation result after the basic data obtaining module obtains the basic network data on the EMS, or displays the service evaluation result after the evaluation execution module obtains the service evaluation result with the service as the granularity.

* * * * *